United States Patent Office.

MEDICINAL COMPOUND.

ZEPHANIAH MARSHALL, OF ANDERSONVILLE, INDIANA.

Letters Patent No. 59,776, dated November 20, 1866.

SPECIFICATION.

TO ALL WHOM IT MAY CONCERN:

Be it known that I, ZEPHANIAH MARSHALL, of Andersonville, in the county of Franklin, and State of Indiana, have invented a new and useful Medical Compound, and I do hereby declare the following to be a full, clear, and exact description of the same, sufficient to enable others skilled in the art to which it appertains to fully understand and use the same:

This medicine, which is intended for the cure of fever and ague, is compounded of equal quantities of dogwood bark and yellow or water willow, which are boiled down to a solid extract or to the consistency of wax, and then prepared for use in the form of pills. These pills have been well tested and are found to be an unfailing specific for fever and ague.

What I claim as my invention, and desire to secure by Letters Patent, is—

The within-described medical compound for the purpose specified.

ZEPHANIAH MARSHALL.

Witnesses:
WM. JONES,
GEO. HOPKINS.